(12) United States Patent
Schroeder et al.

(10) Patent No.: US 11,845,534 B2
(45) Date of Patent: Dec. 19, 2023

(54) SLANTED DUCT STATORS

(71) Applicant: Bell Textron Inc., Fort Worth, TX (US)

(72) Inventors: Karl Schroeder, Southlake, TX (US); Jonathan Knoll, Burleson, TX (US); George Matthew Thompson, Lewisville, TX (US)

(73) Assignee: Textron Innovations Inc., Providence, RI (US)

( * ) Notice: Subject to any disclaimer, the term of this patent is extended or adjusted under 35 U.S.C. 154(b) by 310 days.

(21) Appl. No.: 16/732,083

(22) Filed: Dec. 31, 2019

(65) Prior Publication Data
US 2021/0197956 A1 Jul. 1, 2021

(51) Int. Cl.
*B64C 11/02* (2006.01)
*B64C 11/00* (2006.01)
*B64C 29/00* (2006.01)

(52) U.S. Cl.
CPC ............ *B64C 11/02* (2013.01); *B64C 11/001* (2013.01); *B64C 29/0033* (2013.01)

(58) Field of Classification Search
CPC ....... B64C 11/001; B64C 11/02; B64C 27/20; B64C 29/0025; B64C 29/0033; F04D 29/44; F04D 29/441; F04D 29/54; F04D 29/541; F04D 29/542; F04D 29/545
See application file for complete search history.

(56) References Cited

U.S. PATENT DOCUMENTS

| 2011/0001017 | A1* | 1/2011 | Burdisso | ............... B64C 11/001 244/23 A |
| 2014/0190011 | A1* | 7/2014 | Tanaka | ...................... F01D 9/04 703/2 |
| 2015/0314865 | A1* | 11/2015 | Bermond | ............ B64C 29/0033 244/17.27 |
| 2017/0159674 | A1* | 6/2017 | Maciolek | .................. B64C 7/02 |

FOREIGN PATENT DOCUMENTS

JP H06167300 A * 7/2002 ........... F04D 29/547

OTHER PUBLICATIONS

JPH06167300A_MachineTranslation (Chiyou, K.) Jul. 23, 2002. [retrieved on Nov. 29, 2022] Retrieved from: Espacenet (Year: 2002).*

* cited by examiner

*Primary Examiner* — Elton K Wong
(74) *Attorney, Agent, or Firm* — Lightfoot & Alford PLLC

(57) ABSTRACT

A ducted-rotor aircraft includes a fuselage and first and second ducts that are coupled to the fuselage. Each duct includes a duct ring, a rotor having a plurality of blades, a hub that positions the rotor such that the blades define a blade plane of rotation within the duct ring, and a plurality of stators that are coupled to the hub at respective locations aft of the blade plane of rotation. Each of the plurality of stators defines a leading edge that is slanted toward the blade plane of rotation. The leading edges of the stators are slanted to follow a contour defined by the blades. The leading edges (Continued)

may also be slanted to maintain a distance of at least one blade inboard chord length between the leading edges of the stators and respective trailing edges of the blades.

15 Claims, 6 Drawing Sheets

SLANTED DUCT STATORS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Ducted-rotor aircraft have at least one ducted rotor for providing lift and propulsion forces. Each ducted rotor typically has internal structure that supports a motor of the aircraft and an aerodynamic exterior skin.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

It is desirable to decrease noise generated by aircraft ducted rotors and to increase vibrational stability of such ducted rotors. Structural configurations of ducts are disclosed herein for use in aircraft such as ducted-rotor aircraft.

Figure 1:
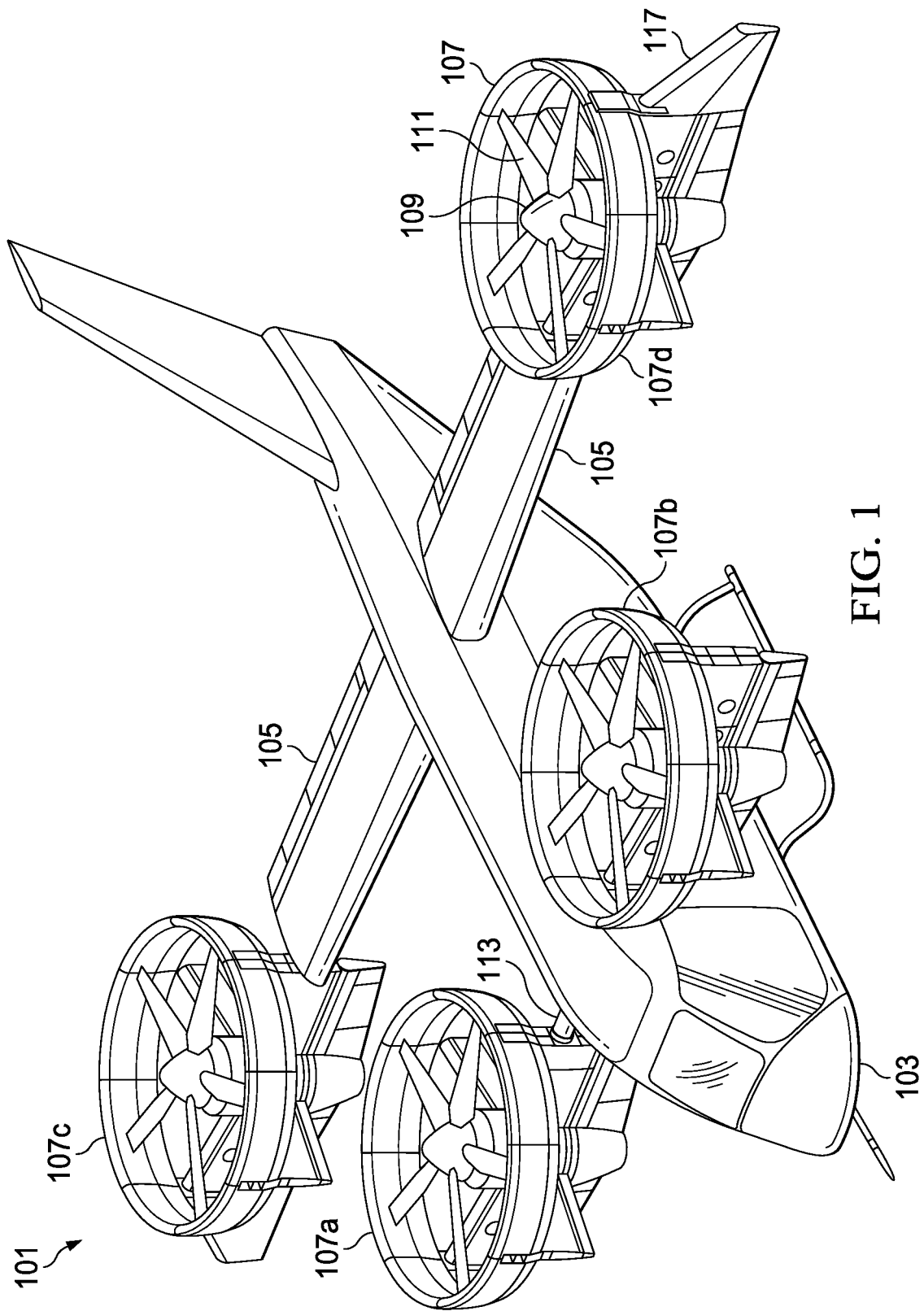
FIG. 1 is an oblique view of an aircraft with ducted rotors, with the ducted rotors configured for the aircraft to operate in a helicopter mode.
Figure 2:
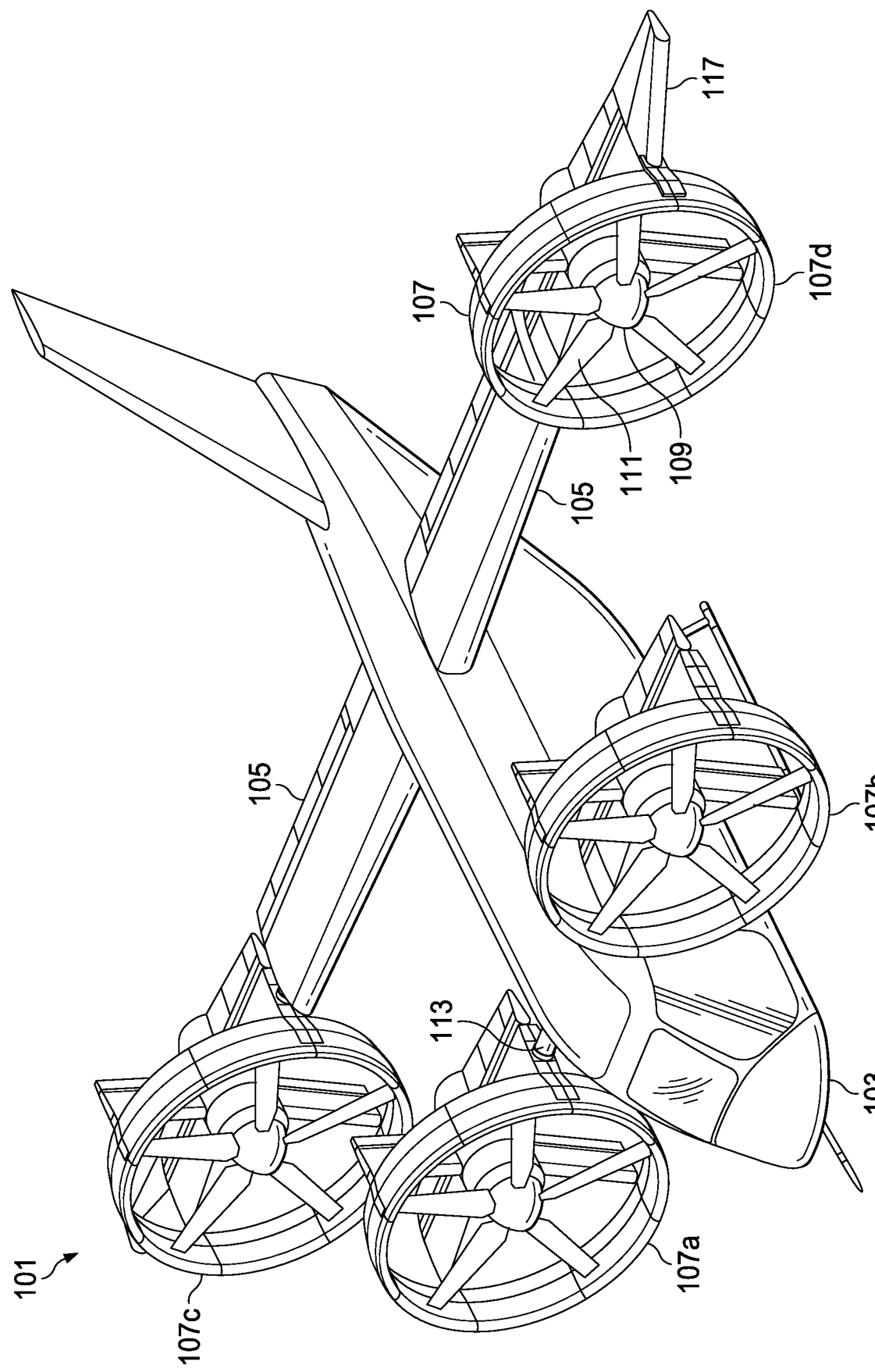
FIG. 2 is an oblique view the aircraft depicted in FIG. 1, with the ducted rotors configured for the aircraft to operate in an airplane mode.

FIGS. 1 and 2 are oblique views of a ducted-rotor aircraft 101. Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight.

Figure 3:
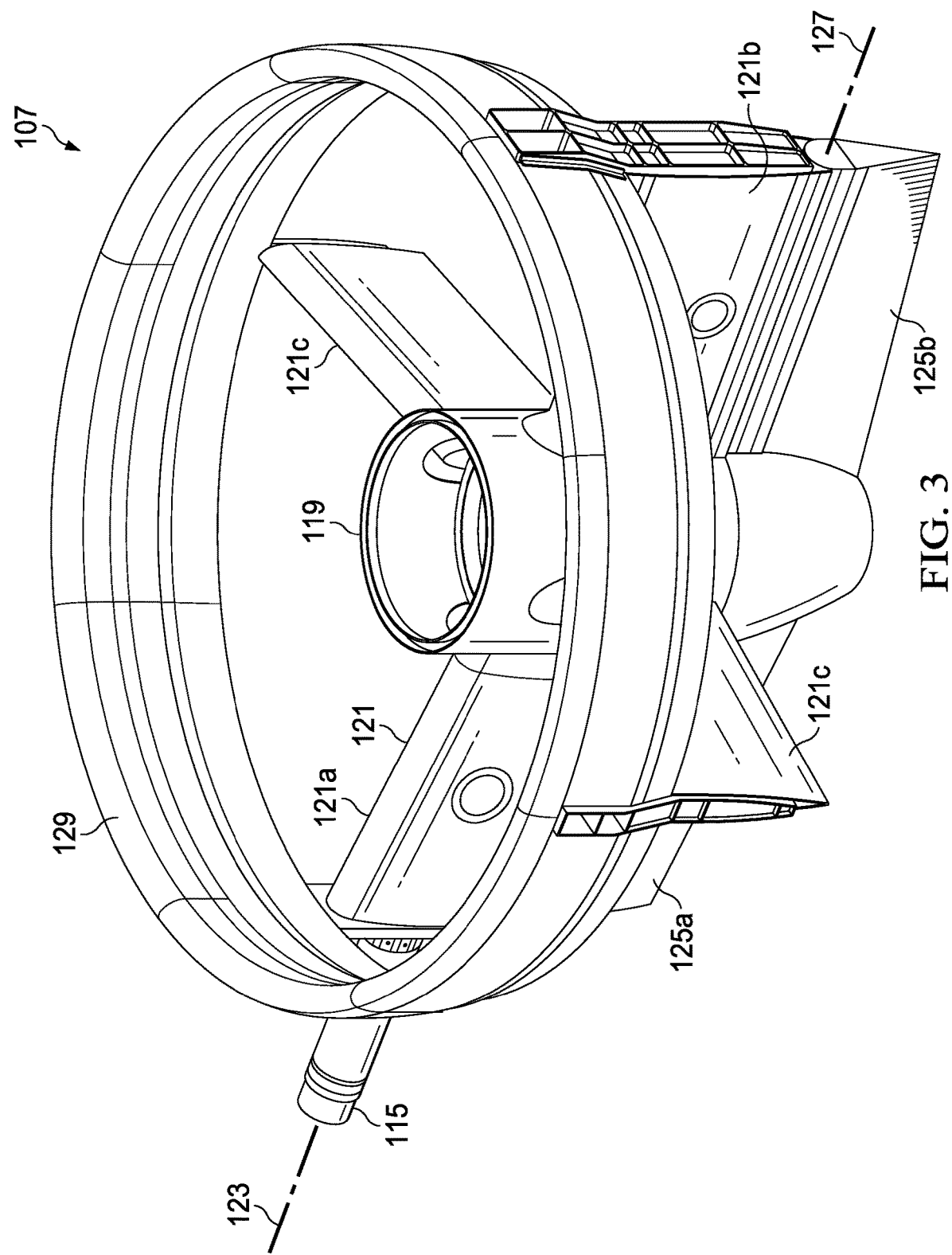
FIG. 3 is an oblique view of a duct of the aircraft depicted in FIG. 1.

In this embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a first spindle 113. Ducts 107c and 107d are each independently coupled to a corresponding end of wing 105 via a respective spindle 115 (e.g., as seen in FIG. 3). As shown, each of ducts 107c and 107d each include a winglet 117 that is coupled thereto. It should be appreciated that aircraft 101 is not limited to the illustrated configuration having four ducts 107, and that aircraft 101 may alternatively be implemented with more or fewer ducts 107.

FIG. 3 is an oblique view of a duct 107 of aircraft 101. Duct 107 is depicted in FIG. 3 without rotor 109. Duct 107 includes a central hub 119 that is configured to support and house a rotor 109 and/or other components. Duct 107 further includes a plurality of stators 121 that extend outwardly from the hub 119. In this embodiment, duct 107 includes four stators 121 that extend radially outward from hub 119. More specifically, duct 107 has two primary stators that include an inboard primary stator 121a and an outboard primary stator 121b. Inboard primary stator 121a is configured to be coupled to a corresponding spindle, such as spindle 113 or spindle 115. Each duct 107 is rotatable about a spindle axis 123 that is defined by spindle 113 or spindle 115. Duct 107 also has two secondary stators 121c. Primary inboard and outboard stators 121a, 121b respectively are configured to carry a larger proportion of the load of duct 107 back to fuselage 103 than are secondary stators 121c. As shown, inboard primary stator 121a and outboard primary stator 121b are longitudinally aligned relative to each other on opposed sides of hub 119 and secondary stators 121c are longitudinally aligned relative to each other on opposed sides of hub 119 and aligned perpendicularly to inboard primary stator 121a and outboard primary stator 121b. In this regard, stators 121 are equally spaced about hub 119. It should be appreciated that duct 107 may be alternatively configured with more or fewer stators 121. It should further be appreciated that duct 107 may be alternatively configured with different spacing of stators 121 about hub 119.

Duct 107 further includes an inboard control vane 125a and an outboard control vane 125b, which are pivotally attached to inboard primary stator 121a and outboard primary stator 121b, respectively. Inboard control vane 125a and outboard control vane 125b are pivotable about a vane axis 127 that extends parallel to spindle axis 123. In this embodiment, inboard control vane 125a and outboard control vane 125b are configured to rotate together to facilitate yaw control, changes of direction, turning, etc. during flight of aircraft 101. It should be appreciated, however, that inboard control vane 125a and outboard control vane 125b may alternatively be configured to rotate independently from one another. It should further be appreciated that duct 107 is not limited to the illustrated configuration of inboard control vane 125a and outboard control vane 125b. For example, duct 107 may alternatively be configured with more or fewer control vanes, such as a single control vane that defines a continuous control surface. Duct 107 may include one or more sections of skin 129 that form an aerodynamic outer covering of duct 107, and that define an opening that extends through duct 107. As shown, hub 119 is located primarily aft of the opening.

Figure 4:
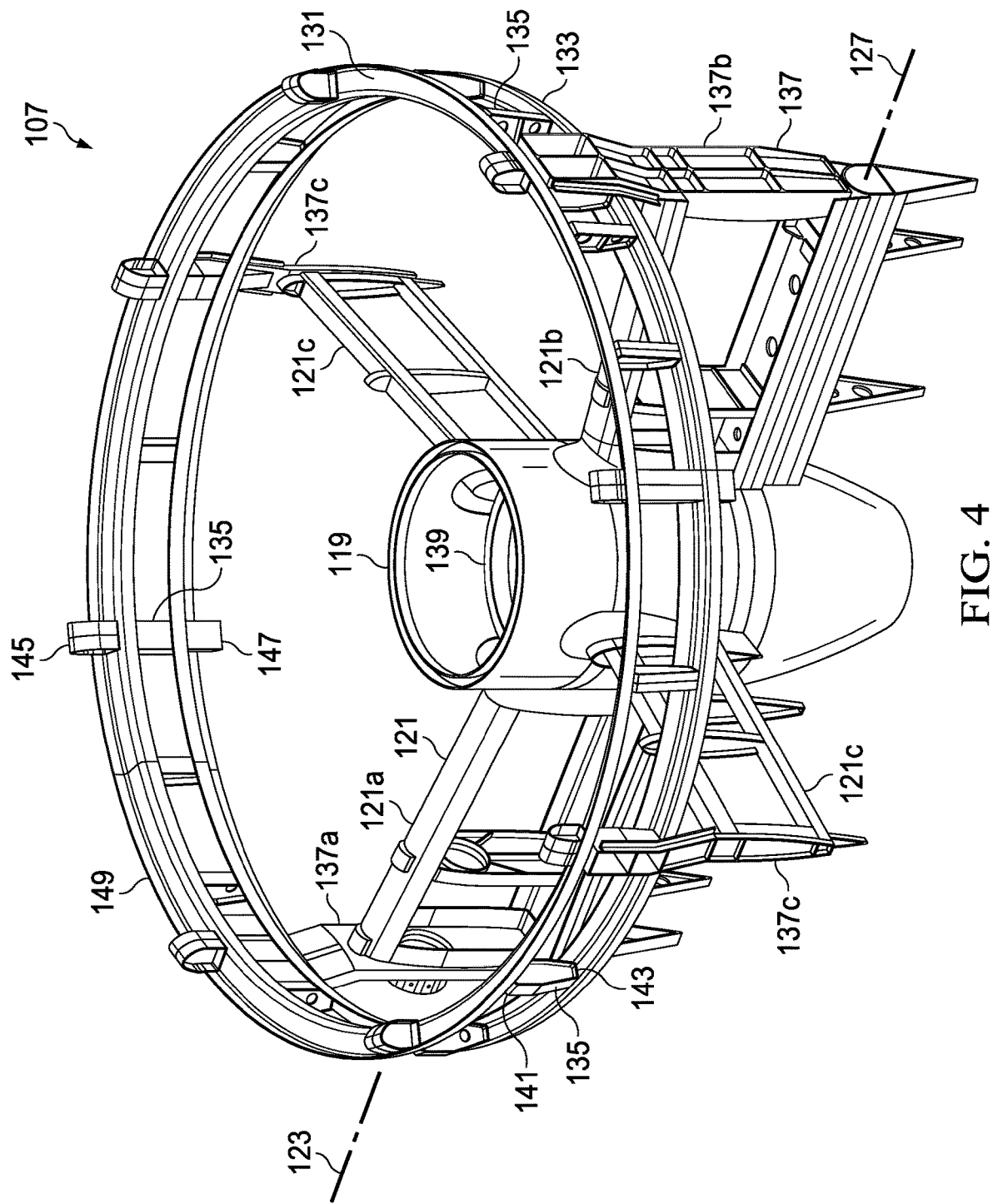
FIG. 4 is an oblique view of the duct depicted in FIG. 3, with an outer skin of the duct removed to illustrate internal components of the duct.

FIG. 4 is an oblique view of duct 107 with aerodynamic exterior skin pieces, including skin 129, removed to illustrate inner components of duct 107. Duct 107 has a structural framework comprised of structural members. The structural framework of duct 107 may be referred to as a duct structure for duct 107. Included among structural members of duct 107 are hub 119, stators 121, an annular forward spar 131, an annular aft spar 133, a plurality of ribs 135, a plurality of fittings 137, and an inner hub assembly 139. Hub assembly 139 is configured for the attachment of a motor (not shown) thereto that drives rotor 109, and configured to facilitate the attachment thereto of other components of duct 107, such as stators 121, mechanisms for adjusting rotor pitch of blades 111, and so on.

Each rib 135 defines an upper end 141 and an opposed lower end 143. The upper end 141 of each rib 135 is configured to attach to forward spar 131, and the lower end 143 of each rib 135 is configured to attach to aft spar 133. As shown, ribs 135 may be configured with differing geometries relative to each other. For example, certain ones of ribs 135 may define one or more apertures that extend therethrough. It should be appreciated that duct 107 is not limited to the illustrated configuration of ribs 135. For example, duct 107 may be implemented with more or fewer ribs and/or with ribs having the same or different geometries as compared to ribs 135.

In this embodiment, duct 107 includes four fittings 137. Each fitting 137 is configured to couple to a second end of a corresponding stator 121. More specifically, duct 107 includes an inboard primary stator fitting 137a that is couplable to a second end of inboard primary stator 121a, an outboard primary stator fitting 137b that is couplable to a second end of outboard primary stator 121b, and two secondary stator fittings 137c that are couplable to respective second ends of secondary stators 121c. The opposed first end of each stator 121 is configured to be coupled to hub assembly 139.

In this embodiment, the structural members of duct 107 further include upper braces 145 and lower braces 147. Upper braces 145 are attached to forward spar 131 and are configured to support corresponding portions of skin 129. As shown, duct 107 includes eight upper braces 145 that are equally spaced apart around forward spar 131, attached to forward spar 131 at locations above every fitting 137 and at midpoints between adjacent fittings 137. Lower braces 147 are attached to aft spar 133 and are configured to support corresponding portions of skin 129. As shown, duct 107 includes four lower braces 147 that are spaced apart around aft spar 133, attached below corresponding upper braces 145. As shown, ribs 135 that are disposed between an upper brace 145 and a lower brace 147 may be wider than others of the plurality of ribs 135.

When assembled, as shown in FIG. 4, forward spar 131, aft spar 133, ribs 135, fittings 137, upper braces 145, and lower braces 147 together comprise a first structural portion of duct 107 that defines a duct ring 149 of duct 107. Duct ring 149 further includes one or more sections of skin 129. As shown, duct ring 149 surrounds a portion of hub 119 and defines a passage through which air moves through duct ring 149. Hub 119, stators 121, and control vane 125 together comprise a second structural portion of duct 107 that supports a motor (not shown) and rotor 109.

When ducts 107 of aircraft 101 are positioned as shown in FIG. 2 with blades 111 of rotors 109 rotating, air will move into the duct rings 149 of ducts 107 past forward spars 131 as rotors 109 generate thrust that causes aircraft 101 to move in a forward direction. As air moves through ducts 107 while blades 111 of rotors 109 are rotating, the air will move past aft spars 133 and be exhausted over control vanes 125 and away from ducts 107, for example in an aft direction as aircraft 101 moves in a forward direction. In this regard, control vanes 125 are mounted aft of blades 111 of rotors 109.

One or both of forward spar 131 and aft spar 133 may be constructed of composite material. In the instant disclosure, composite material preferably refers to plies of a fiber-reinforced plastic (FRP) composition that includes filament fibers, such as carbon fibers for example, embedded in a thermoset polymer matrix material such as a thermoplastic resin. Preferably the fibers within the plies are woven and the plies are pre-impregnated with resin. To illustrate, forward spar 131 and aft spar 133 may be constructed from one or more layered plies of carbon-fiber-reinforced plastic (CFRP). It should be appreciated that duct 107 is not limited to an implementation having two spars such as forward spar 131 and aft spar 133. For example, duct 107 may be alternatively implemented with more or fewer spars.

Figure 5A:
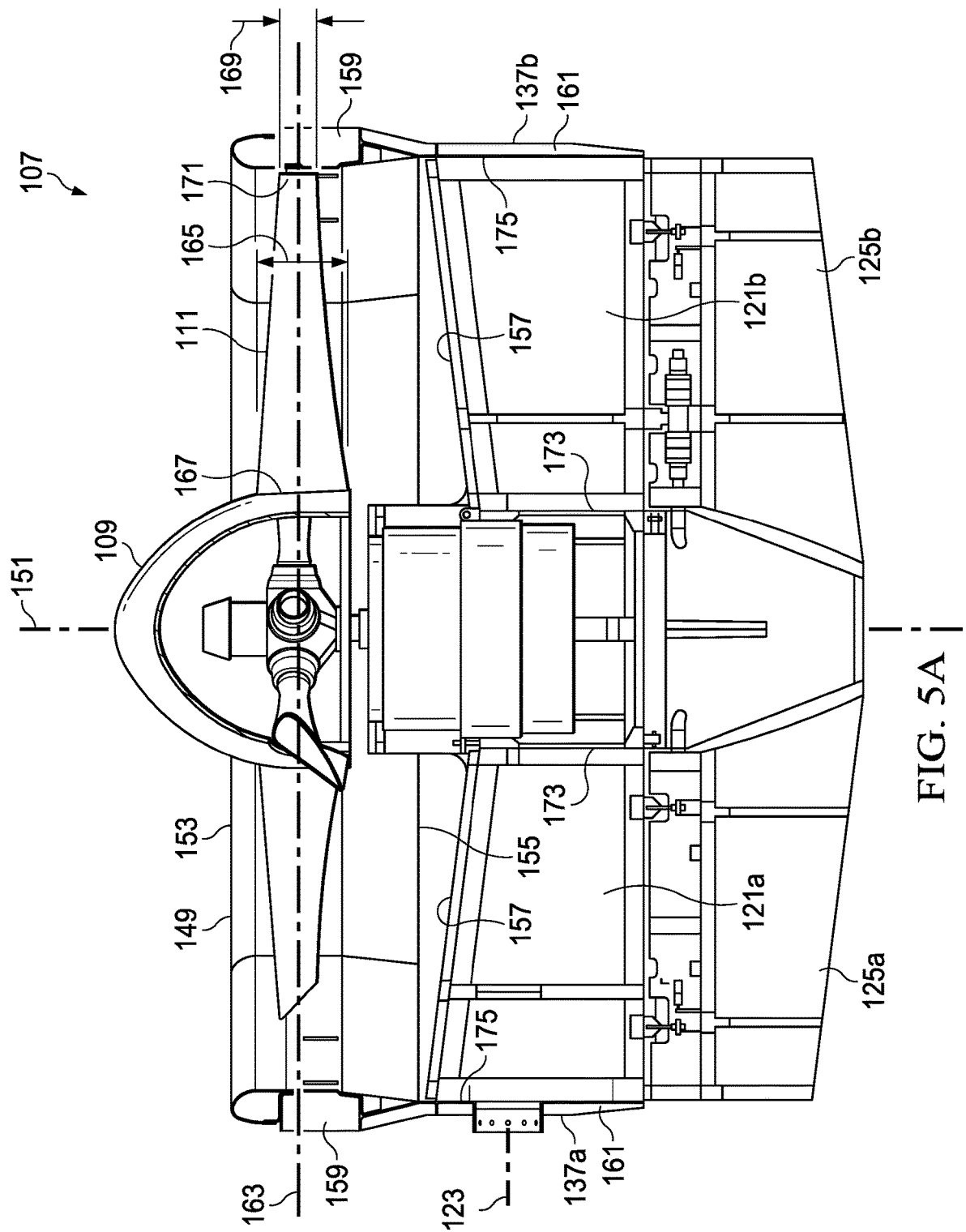
FIG. 5A is a first cross-sectional view of the duct depicted in FIG. 3.
Figure 5B:
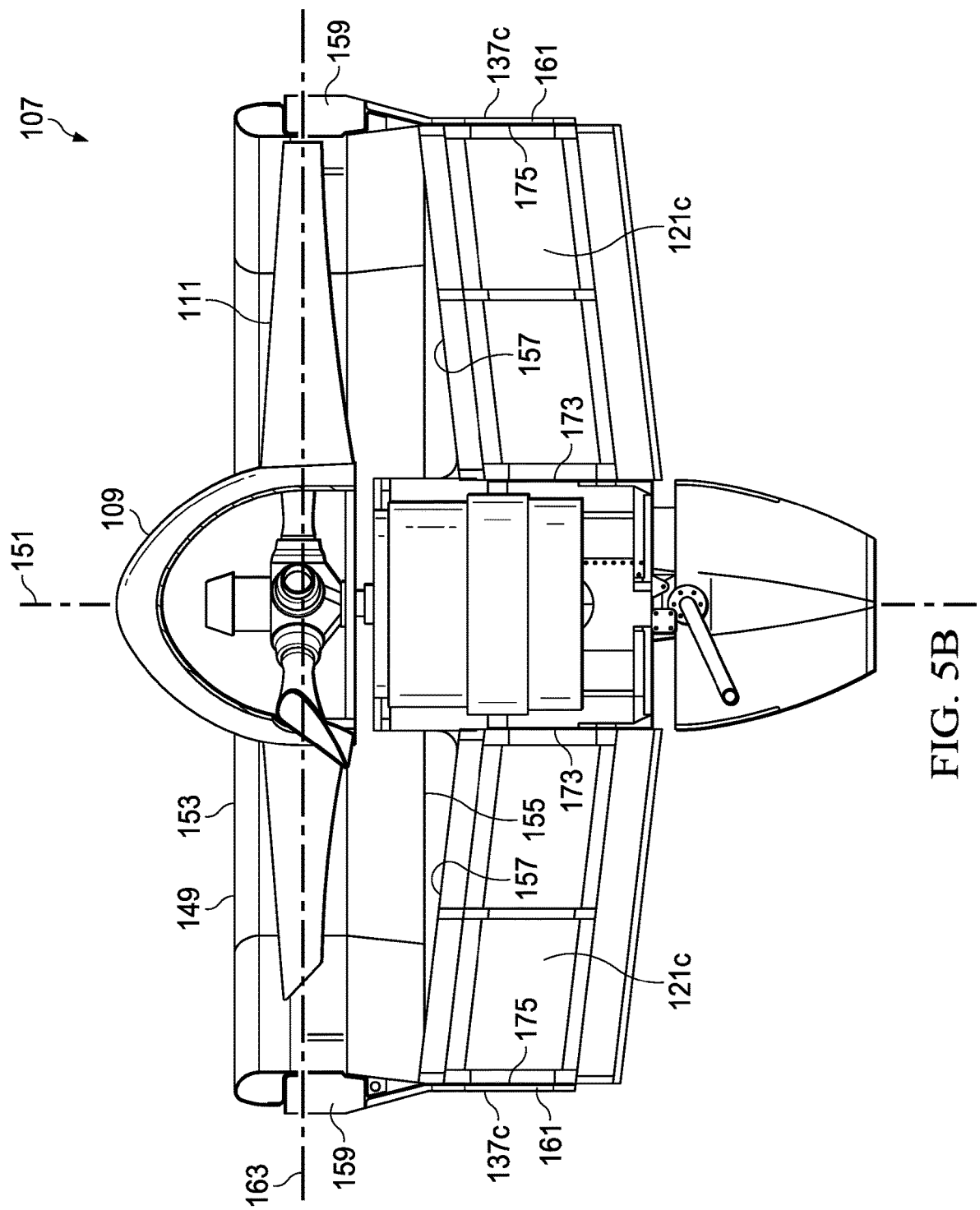
FIG. 5B is a first cross-sectional view of the duct depicted in FIG. 3.

FIG. 5A is a cross-sectional view of duct 107, taken along a plane that extends parallel to a longitudinal midline of inboard primary stator 121a and outboard primary stator 121b and extends parallel to a central duct axis 151 about which rotor 109 rotates. FIG. 5B is a cross-sectional view of duct 107, taken along a plane that extends parallel to a longitudinal midline of secondary stators 121c and extends parallel to central duct axis 151. Duct ring 149 defines a circumferential leading edge 153 and a circumferential trailing edge 155. Each stator 121 defines a leading edge 157.

In this embodiment, duct 107 includes inboard primary stator fitting 137a, outboard primary stator fitting 137b, and a pair of secondary stator fittings 137c. As shown, each fitting 137 includes a first attachment interface 159 that is configured to couple to structure of duct ring 149 and a second attachment interface 161 that is configured to couple to a corresponding stator 121 of duct 107. For each fitting 137, first attachment interface 159 is spaced from second attachment interface 161 such that when fitting 137 is coupled to duct ring 149 and a corresponding stator 121, all or substantially all of stator 121 is located aft of trailing edge 155 of duct ring 149.

For example, as shown in FIG. 5A, first attachment interface 159 of inboard primary stator fitting 137a is spaced from second attachment interface 161 thereof such that when inboard primary stator fitting 137a is coupled to duct ring 149 and inboard primary stator 121a, all of inboard primary stator 121a is located aft of trailing edge 155 of the duct ring 149. Similarly, first attachment interface 159 of outboard primary stator fitting 137b is spaced from second attachment interface 161 thereof such that when outboard primary stator fitting 137b is coupled to duct ring 149 and inboard primary stator 121a, all of outboard primary stator 121b is located aft of trailing edge 155 of the duct ring 149. Additionally, as shown in FIG. 5B, for each of secondary stator fittings 137c, first attachment interface 159 is spaced from second attachment interface 161 such that when secondary stator fitting 137c is coupled to duct ring 149 and a corresponding secondary stator 121c, substantially all of secondary stator 121c is located aft of trailing edge 155 of the duct ring 149. As shown, when fittings 137 are installed in duct 107, second attachment interfaces 161 are located radially inward from first attachment interfaces 159, relative to central duct axis 151. It should be appreciated that while the illustrated configurations of fittings 137 cause all or substantially all of each of stators 121 to be located aft of trailing edge 155 of duct ring 149, fittings 137 may be alternatively configured to position one or more stators 121 in other locations relative to duct ring 149.

As shown, hub 119 is configured to position rotor 109 such that the plurality of blades 111 of rotor 109 define a blade plane of rotation 163 within duct ring 149. Blade plane of rotation 163 extends perpendicular to central duct axis 151. In this embodiment, each blade 111 defines an inboard chord length 165 measured at a root 167 of blade 111 that is greater than an outboard chord length 169 measured at a tip 171 of blade 111. Furthermore, each blade 111 exhibits twist between root 167 and tip 171. As a result, each blade 111 defines a curved perimeter contour.

Each stator 121 defines a first end 173 and an opposed second end 175. First end 173 of each stator 121 is configured to couple to hub assembly 139, and thus to hub 119. As shown, stators 121 are coupled to hub 119 at respective locations that are aft of blade plane of rotation 163. As shown, secondary stators 121c are coupled to hub 119 at locations that are nearer to blade plane of rotation 163 than are the locations where inboard primary stator 121a and outboard primary stator 121b are coupled to hub 119. It should be appreciated that stators 121 are not limited to the illustrated locations at which they are coupled to hub 119, and that one or more of stators 121 may alternatively be coupled to hub 119 in locations different from those illustrated.

Leading edges 157 of one or more of stators 121 may be slanted toward blade plane of rotations 163. In this embodiment, each stator 121 is configured such that leading edge 157 is slanted toward blade plane of rotation 163. Stated differently, leading edge 157 of each stator 121 slants in an inclined fashion with increasing radial distance from first end 173 when duct 107 is oriented as shown in FIGS. 5A and 5B. As shown, leading edges 157 of stators 121 are slanted to at least approximately follow the perimeter contour defined by blades 111. More specifically, while blades 111 define a curved perimeter contour, leading edges 157 of stators are preferably slanted along a straight trajectory. Stated differently, in this embodiment leading edges 157 of stators 121 are not curved to precisely mimic the curved perimeter contour of blades 111.

Furthermore, leading edges 157 of stators 121 are slanted, from first end 173 to second end 175, to maintain a distance of at least one inboard chord length 165 between leading edges 157 and respective trailing edges of blades 111. It was observed that locating leading edges 157 of stators 121 aft of blade plane of rotation 163 by a distance of at least one inboard chord length 165 and slanting leading edges 157 to maintain a distance of at least one inboard chord length 165 between leading edges 157 and respective trailing edges of blades 111 decreases noise generated by duct 107 and increases vibrational stability of ducts 107. It should be appreciated that stators 121 are not limited to the illustrated slant of leading edges 157. For example, one or more of stators 121 may be alternatively configured to such that leading edges 157 are slanted more steeply, slanted more shallowly, curved to match a blade contour, or the like. Additionally, one or more of stators 121 may be alternatively configured such that leading edge 157 slants in a declined fashion with increasing radial distance from first end 173, or in other words is slanted away from blade plane of rotation 163.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A duct structure for a duct of a ducted-rotor aircraft, the duct including a rotor having a plurality of blades, the duct structure comprising:
    a duct ring;
    a hub that is configured to position the rotor such that the plurality of blades define a blade plane of rotation within the duct ring; and
    a plurality of stators that are coupled to the hub at respective locations aft of the blade plane of rotation,
    wherein at least one stator of the plurality of stators defines a leading edge that is slanted toward the blade plane of rotation; and
    wherein no portion of the at least one stator of the plurality of stators is disposed along an axial length of the duct ring.

2. The duct structure of claim 1, wherein the leading edge of the at least one stator of the plurality of stators is slanted such that the leading edge follows a contour defined by each of the plurality of blades.

3. The duct structure of claim 2, wherein the leading edge of the at least one stator of the plurality of stators is slanted to maintain a distance of at least one blade inboard chord length between the leading edge of the at least one stator of the plurality of stators and respective trailing edges of the plurality of blades.

4. The duct structure of claim 3, wherein the leading edge of the at least one stator of the plurality of stators is not curved.

5. The duct structure of claim 1, wherein each of the plurality of stators is coupled to the duct ring.

6. The duct structure of claim 1, wherein each of the plurality of stators extends radially outward from the hub.

7. The duct structure of claim 1, wherein the duct ring surrounds a portion of the hub.

8. A ducted-rotor aircraft comprising:
a fuselage; and
at least one duct coupled to the fuselage, the at least one duct comprising:
a duct ring;
a rotor having a plurality of blades;
a hub that positions the rotor such that the plurality of blades define a blade plane of rotation within the duct ring; and
a plurality of stators that are coupled to the hub at respective locations aft of the blade plane of rotation,
wherein at least one stator of the plurality of stators defines a leading edge that is slanted toward the blade plane of rotation; and
wherein no portion of the at least one stator of the plurality of stators is disposed along an axial length of the duct ring.

9. The ducted-rotor aircraft of claim 8, wherein the leading edge of the at least one stator of the plurality of stators is slanted such that the leading edge follows a contour defined by each of the plurality of blades.

10. The ducted-rotor aircraft of claim 9, wherein each of the plurality of blades defines an inboard chord length that is greater than an outboard chord length.

11. The ducted-rotor aircraft of claim 10, wherein the leading edge of the at least one stator of the plurality of stators is slanted to maintain a distance of at least one inboard chord length between the leading edge of the at least one stator of the plurality of stators and respective trailing edges of the plurality of blades.

12. The ducted-rotor aircraft of claim 9, wherein the leading edge of the at least one stator of the plurality of stators is not curved.

13. The ducted-rotor aircraft of claim 8, wherein each of the plurality of stators is coupled to the duct ring.

14. The ducted-rotor aircraft of claim 8, wherein each of the plurality of stators extends radially outward from the hub.

15. The ducted-rotor aircraft of claim 8, wherein the duct ring surrounds a portion of the hub.

* * * * *